(12) United States Patent
Leuthold et al.

(10) Patent No.: US 7,076,120 B2
(45) Date of Patent: Jul. 11, 2006

(54) OPTICAL PULSE GENERATOR FOR RETURN-TO-ZERO SIGNALING

(75) Inventors: Juerg Leuthold, Eatontown, NJ (US); Xing Wei, New Providence, NJ (US); Liming Zhang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 241 days.

(21) Appl. No.: 10/190,949

(22) Filed: Jul. 8, 2002

(65) Prior Publication Data
US 2004/0005110 A1    Jan. 8, 2004

(51) Int. Cl.
G02B 6/26 (2006.01)
G02F 1/035 (2006.01)

(52) U.S. Cl. .............................. 385/3; 385/27; 398/183

(58) Field of Classification Search ................ 385/1–3, 385/15, 27, 24; 398/183, 185, 188, 186
See application file for complete search history.

(56) References Cited

U.S. PATENT DOCUMENTS

| | | | | |
|---|---|---|---|---|
| 5,432,631 A | * | 7/1995 | Mamyshev | 398/188 |
| 5,477,375 A | * | 12/1995 | Korotky et al. | 359/264 |
| 5,596,661 A | * | 1/1997 | Henry et al. | 385/24 |
| 5,963,567 A | * | 10/1999 | Veselka et al. | 372/21 |
| 6,760,142 B1 | * | 7/2004 | Leuthold et al. | 359/279 |
| 6,963,685 B1 | * | 11/2005 | Mahgerefteh et al. | 385/37 |
| 2003/0058508 A1 | * | 3/2003 | Webb et al. | 359/181 |
| 2005/0190432 A1 | * | 9/2005 | Futami et al. | 359/299 |

OTHER PUBLICATIONS

H. Murata et al. Optical pulse generation by electrooptic-modulation method and its application to integrated ultrashort pulse generators. IEEE Journal on Selected Topics in Quantum Electronics, vol. 6 No. 6, pp. 1325-1331, Nov. 2000.*
T. Kobayashi et al. Optical pulse compression using high-frequency electrooptic phase modulation. IEEE Journal of Quantum Electronics, vol. 24 No. 2, pp. 382-387, Feb. 1988.*
T. Otsuji et al. 10-80-Gb/s highly extinctive electrooptic pulse pattern generation. IEEE Journal on Selected Topics in Quantum Electronics, vol. 2 No. 3, pp. 643-649, Sep. 1996.*
K. Takiguchi et al. Dispersion compensation using a planar lightwave circuit optical equalizer. IEEE Photonics Technology Letters, vol. 6 No. 4, pp. 561-564, Apr. 1994.*

(Continued)

Primary Examiner—Rodney Bovernick
Assistant Examiner—Mike Stahl

(57) ABSTRACT

The specification describes an optical pulse generator in a return-to-zero format in which a phase-modulated (PM) optical signal is converted to intensity-modulated (IM) optical pulses using chromatic dispersion. Compared with Mach-Zehnder-modulator-based pulse generators, this scheme is potentially more efficient (lower insertion loss). The pulse generator of the invention is suitable for very high data rates, e.g. 40 Gb/s. The structure of the pulse generator is a phase-modulated pulse source combined with a dispersive element having the required dispersion.

11 Claims, 5 Drawing Sheets

OTHER PUBLICATIONS

L. Xu et al. All-optical data format conversion between RZ and NRZ based on a Mach-Zehnder interferometric wave length converter. IEEE Photonics Technology Letters, vol. 15 No. 2, pp. 308-310, Feb. 2003.*

* cited by examiner $\tau_1 = \tau_2 = 12.5 \text{ ps}$ $\phi_1 = \phi_2 = \pi/2$

OPTICAL PULSE GENERATOR FOR RETURN-TO-ZERO SIGNALING

FIELD OF THE INVENTION

This invention relates to optical pulse generators and more specifically to return-to-zero pulse generators useful in long haul optical fiber communications.

BACKGROUND OF THE INVENTION

The return-to-zero (RZ) modulation format is important for long haul and ultra-long haul high bit-rate optical fiber communication systems. Here, reference to high-bit rate systems is intended to mean lightwave systems operating at a bit-rate of at least 10 Gb/s, and preferably 40 Gb/s. The RZ format implies that the optical pulses in the pulse stream return to a zero amplitude level at the beginning and end of each pulse. This is especially valuable in long haul and ultra-long haul optical fiber transmission systems where the system performance is limited by amplified spontaneous emission (ASE) noise and fiber nonlinearity. A chirp-free optical pulse generator is crucial in the design of an RZ transmitter. The most commonly used technique to generate a chirp-free RZ pulse stream employs a continuous wave (CW) laser and a sinusoidally driven Mach-Zehnder modulator (MZM), typically a LiNbO$_3$ modulator. See U.S. Pat. No. 5,477,375, "Optical soliton generator" to Korotky, et al. Recently we have demonstrated an alternative technique employing phase modulation and a delay interferometer to produce chirp-free optical pulses. See U.S. patent application Ser. No. 10/144,477, X. Wei, J. Leuthold, and L. Zhang filed on May 13, 2002), which is incorporated herein by reference. Similar to the MZM approach, the delay interferometer approach is also interference-based.

STATEMENT OF THE INVENTION

We have devised another new approach for generating RZ optical pulses in which a phase-modulated (PM) optical signal is converted to intensity-modulated (IM) optical pulses using chromatic dispersion. Since this method does not rely on interference, it differs from all other existing techniques mentioned above. PM to IM conversion due to chromatic dispersion has been studied since the early days of optical fiber communications. See A. R. Chraplyvy, et al., "Phase modulation to amplitude modulation conversion of CW laser light in optical fibers", Electronics Letters, Vol. 22, pp. 409–411(1986). However the use of dispersion to compress a CW laser input into a periodic optical pulse train for making an RZ transmitter is a new approach. Challenges are the extinction ratio and chirp.

In the development of this invention it was demonstrated that essentially chirp-free pulses with essentially infinite extinction ratio can be achieved with this technique. Compared with a conventional MZM pulse generator, this dispersion-based scheme is potentially more efficient (lower insertion loss). The pulse generator of the invention is suitable for very high data rates, e.g. 40 Gb/s.

The structure of the pulse generator is a phase-modulated CW source combined with a dispersive element having the required dispersion properties.

DETAILED DESCRIPTION OF THE INVENTION

Figure 1:
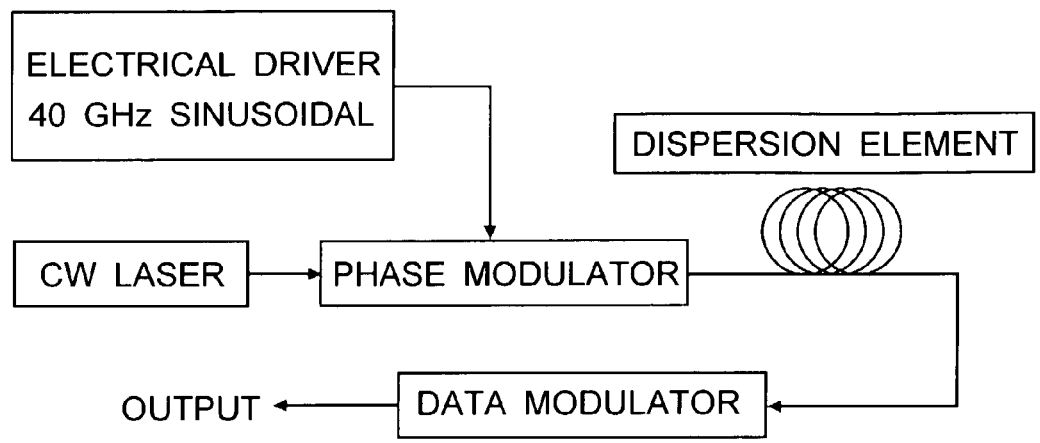
FIG. 1 shows a diagram of an optical pulse generator according to the invention.

With reference to FIG. 1, the basic elements of the optical pulse source of the invention are shown in a schematic diagram. The primary input is a CW laser. In typical high bit rate communications systems the wavelength of the laser is in the range 1540–1620 nm. The laser is sinusoidally modulated at an angular frequency $\Omega$, with a peak-to-peak phase shift $\Delta\phi_{p\text{-}p}$. The modulation frequency, $\Omega/2\pi$, is equal to the repetition rate R. In the illustration and demonstrations used here the repetition rate R=40 GHz. In FIG. 1 the phase modulation is achieved with an external phase modulator. An alternative method is to use a directly frequency-modulated semiconductor laser.

The phase-modulated signal is then introduced into a dispersive element. The term "dispersive element" here is intended as meaning an element that causes at least 10 ps/nm of dispersion in the light signal passing through it. In this illustration the dispersive element is shown as a length of optical fiber, which is a convenient symbol for a dispersive element. The length of optical fiber in the dispersive element is chosen to provide the desired dispersion value (either positive or negative). Typically the accumulated dispersion scales directly with the fiber length. In the usual case employing dispersion compensating fiber (DCF) or standard single mode fiber (SMF), this length will be in the range from hundreds of meters to kilometers. The output of the dispersive element is then fed to the information or data encoding device. The output signal from the data modulator is transmitted, usually long haul, to a remote receiving station. A typical phase modulator, for example a LiNbO3 phase modulator, produces a phase shift proportional to the driver voltage. The phase-modulated output signal can be described by $$E_{PM}(t) = A\exp\left(-i\omega_0 t + i\frac{\Delta\phi_{p\text{-}p}}{2}\sin\Omega t\right) + c.c., \quad (1)$$

where A and $\omega_0$ are the amplitude and angular frequency of the input signal, $\Omega$ is the angular frequency of the sinusoidal electronic driver signal, $\Delta\phi_{p\text{-}p}$ is the peak-to-peak phase shift or modulation depth, and c.c. stands for complex conjugate. As stated earlier, $\Omega$ is related to the desired pulse repetition rate R through $\Omega=2\pi R$.

Equation (1) can be rewritten in the following form to separate the real part and imaginary part of the complex amplitude, $$E_{PM}(t) = A\left[\cos\left(\frac{\Delta\phi_{p-p}}{2}\sin\Omega t\right) + i\sin\left(\frac{\Delta\phi_{p-p}}{2}\sin\Omega t\right)\right]\exp(-i\omega_0 t) + c.c. \quad (2)$$

Using Taylor Expansion $$\cos\left(\frac{\Delta\phi_{p-p}}{2}\sin\Omega t\right) = 1 - \frac{1}{2}\left(\frac{\Delta\phi_{p-p}}{2}\sin\Omega t\right)^2 + \frac{1}{4!}\left(\frac{\Delta\phi_{p-p}}{2}\sin\Omega t\right)^4 - \cdots, \quad (3)$$

we find that $$\cos\left(\frac{\Delta\phi_{p-p}}{2}\sin\Omega t\right),$$

the real part of the complex amplitude in Eq. (2), contains only even harmonic frequencies $0, \pm 2\Omega, \pm 4\Omega, \ldots$ i.e., when expanded as a Fourier series it has the form $$\cos\left(\frac{\Delta\phi_{p-p}}{2}\sin\Omega t\right) = \sum_n \tilde{a}_n\exp(-i2n\Omega t).$$

Similarly, from the expansion $$\sin\left(\frac{\Delta\phi_{p-p}}{2}\sin\Omega t\right) = \frac{\Delta\phi_{p-p}}{2}\sin\Omega t - \frac{1}{3!}\left(\frac{\Delta\phi_{p-p}}{2}\sin\Omega t\right)^3 + \frac{1}{5!}\left(\frac{\Delta\phi_{p-p}}{2}\sin\Omega t\right)^5 - \cdots, \quad (4)$$

we find that $$\sin\left(\frac{\Delta\phi_{p-p}}{2}\sin\Omega t\right),$$

the imaginary part of the complex amplitude, contains only odd harmonic frequencies $\pm\Omega, \pm 3\Omega, \pm 5\Omega \ldots$ i.e. when expaned as a Fourier row it has the form $$\sin\left(\frac{\Delta\phi_{p-p}}{2}\sin\Omega t\right) = \sum_n \tilde{b}_n\exp[-i(2n+1)\Omega t].$$

The above analysis shows that the phase-modulated signal $E_{PM}(t)$ contains discrete Fourier components ($\omega_0$, $\omega_0\pm\Omega$, $\omega_0\pm 2\Omega$, $\omega_0\pm 3\Omega$, ...) equally separated by $\Omega$, and that the Fourier components with even offset frequencies ($\omega_0$, $\omega_0\pm 2\Omega$, $\omega_0\pm 4\Omega$, ...) and odd offset frequencies ($\omega_0\pm\Omega$, $\omega_0\pm 3\Omega$, $\omega_0\pm 5\omega$, ...) are analytically separated in Eq. (2). The coefficients $\tilde{a}_n$ and $\tilde{b}_n$ of these Fourier components can be computed through the Jacobi-Anger expansion $$\exp(iz\cos\theta) = \sum_{n=-\infty}^{\infty} i^n J_n(z)\exp(in\theta), \quad (5)$$

where $J_n(z)$ is the Bessel function of the first kind. However, the exact values of $\tilde{a}_n$ and $\tilde{b}_n$ are not critical in the following analysis.

As shown in FIG. 1, a dispersive element, here a length L of optical fiber is installed following the phase modulator. The fiber dispersion can be described by a frequency dependent phase factor $\exp[i\beta(\omega)L]$ added to the light signal traveling in the fiber, and the propagation constant $\beta(\omega)$ can be expanded in Taylor series $$\beta(\omega) = \beta_0 + \beta_1(\omega-\omega_0) + \frac{1}{2}\beta_2(\omega-\omega_0)^2 + \frac{1}{6}\beta_3(\omega-\omega_0)^3 + \cdots. \quad (6)$$

Here, $\beta_0$ and $\beta_1$ only produce an unimportant phase factor $\exp[i(\beta_0 L-\beta_1\omega_0 L)]$ and a trivial group velocity delay $\Delta t=\beta_1 L$. If this common phase factor is neglected, and also the time reference is reset to compensate the group delay, a phase factor starting with $\beta_2$ is $$f(\omega) = \exp\left[\frac{i}{2}\beta_2 L(\omega-\omega_0)^2 + \frac{i}{6}\beta_3 L(\omega-\omega_0)^3 + \cdots\right]. \quad (7)$$

In the following we neglect the contributions from higher order terms $\beta_3, \beta_4, \ldots$ and use the following approximation $$f(\omega) \approx \exp\left[\frac{i}{2}\beta_2 L(\omega-\omega_0)^2\right]. \quad (8)$$

If we choose the group velocity dispersion $\beta_2$ (assuming $\beta_2>0$, as is the case for DCF) and the length L of the fiber such that $$\beta_2 L\Omega^2=\pi, \quad (9)$$

then for all the even offset frequency components $\omega=\omega_0\pm 2n\Omega$ ($n=0, \pm 1, \pm 2, \ldots$), which have been grouped in Eq. (3), we find $$f(\omega) \approx \exp\left[\frac{i}{2}\beta_2 L(2n\Omega)^2\right] = \exp(i2n^2\pi) = 1, \quad (10)$$

and for all the odd offset frequency components $\omega=\omega_0\pm(2n+1)\Omega$, which have been grouped in Eq. (4), we find $$f(\omega) \approx \exp\left[\frac{i}{2}\beta_2 L(2n+1)^2\Omega^2\right] = \exp\left[i\left(2n^2+2n+\frac{1}{2}\right)\pi\right] = i. \quad (11)$$

Therefore the effect of the fiber dispersion is simply to add a phase factor of i to all the odd offset frequency components and keep all the even offset frequency components unchanged. The net effect of this is simply to multiply the imaginary part of the complex amplitude in Eq. (2) with a factor of i, which would convert the phase-modulated signal to a chirp-free intensity-modulated signal (the fiber loss is neglected)

$$E_{IM}(t) = A\left[\cos\left(\frac{\Delta\phi_{p-p}}{2}\sin\Omega t\right) - \sin\left(\frac{\Delta\phi_{p-p}}{2}\sin\Omega t\right)\right]\exp(-i\omega_0 t) + c.c. \quad (12)$$
$$= \sqrt{2}A\cos\left(\frac{\pi}{4} + \frac{\Delta\phi_{p-p}}{2}\sin\Omega t\right)\exp(-i\omega_0 t) + c.c.$$

Equation (12) indicates that the phase modulation magnitude $\Delta\phi_{p-p}$ is directly related to the modulation depth of the converted intensity-modulated signal. Using $$\Delta\phi_{p-p} = \frac{\pi}{2}, \quad (13)$$

yields $$E_{IM}(t) = \sqrt{2}A\cos\left[\frac{\pi}{4}(1 + \sin\Omega t)\right]\exp(-i\omega_0 t) + c.c., \quad (14)$$

which is a periodic pulse train with a repetition rate $R=\Omega/2\pi$, an infinite extinction ratio, and a duty cycle of 50%. Since all the losses are neglected here, the peak power of the output pulses is twice (3 dB) as large as the input CW laser power and the total (or average) optical power is conserved. This is in strong contrast to MZM pulse generating schemes in which the theoretical output peak power cannot be higher than the CW input power.

Although it was assumed that $\beta_2>0$ for the above derivations, the basic conclusion is still valid for $\beta_2<0$ with only a sign change in Eq. (9) and Eq. (14). The required chromatic dispersion D, which is more commonly used in the lightwave community, can be easily calculated. From Eq. (9) and the relation between $\beta_2$ and D $$D = -\frac{2\pi c}{\lambda^2}\beta_2, \quad (15)$$

the required accumulated group-velocity dispersion (GVD) is $$|DL| = \frac{2\pi^2 c}{\lambda^2 \Omega^2} = \frac{c}{2\lambda^2 R^2}. \quad (16)$$

For example, using $\lambda=1550$ nm, $R=40$ GHz, and $c=3\times10^8$ m/s, $|DL|$ is approximately equal to 39 ps/nm. This is easily achievable with DCF or SMF. Other dispersive devices, for example, tunable fiber Bragg gratings, can also be used to provide the required dispersion. The actual values of dispersion will vary with the factors just given. In the context of the practice of this invention, the dispersion values may be calculated using equation (16). The actual values used may vary ± approximately 20% and still yield the benefits of the invention.

The condition of $\pi/2$ modulation magnitude [Eq. (13)] is not a critical requirement, and some small fluctuation around $\pi/2$ is tolerable. From Eq. (12) we can derive the extinction ratio of the intensity-modulated waveform $$\text{Extinction ratio (dB)} = 10\log\frac{\cos\left(\frac{\pi}{4} - \frac{\Delta\phi_{p-p}}{2}\right)^2}{\cos\left(\frac{\pi}{4} + \frac{\Delta\phi_{p-p}}{2}\right)^2}. \quad (17)$$

Figure 2:
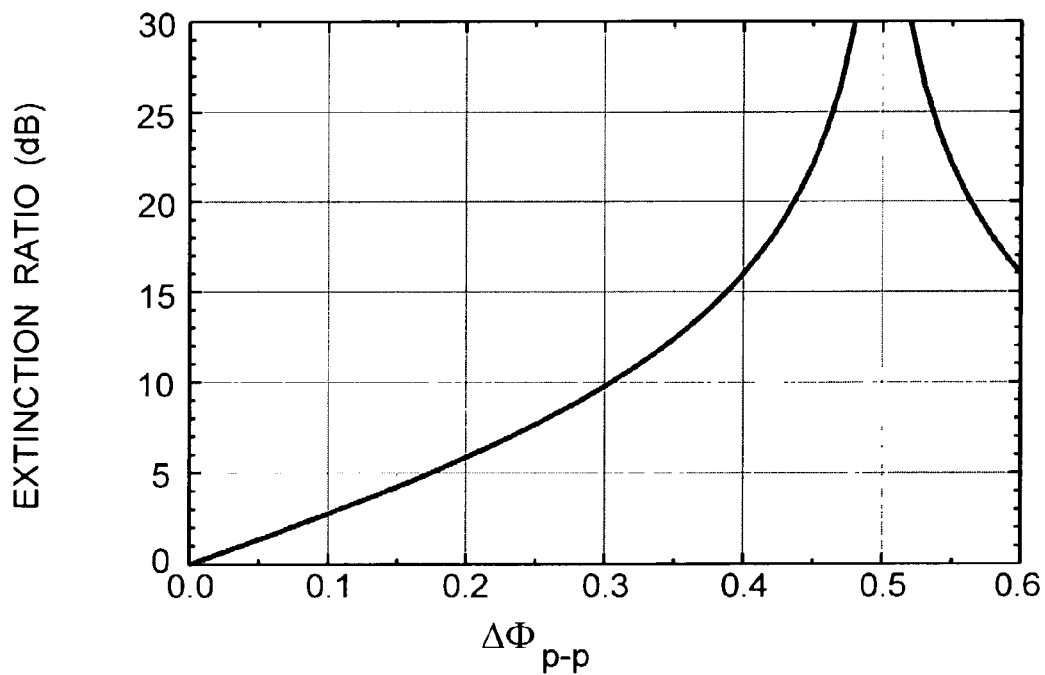
FIG. 2 is a plot of extinction ratio in dB vs. peak-to-peak phase shift in the phase-modulated pulse train.
Figure 3:
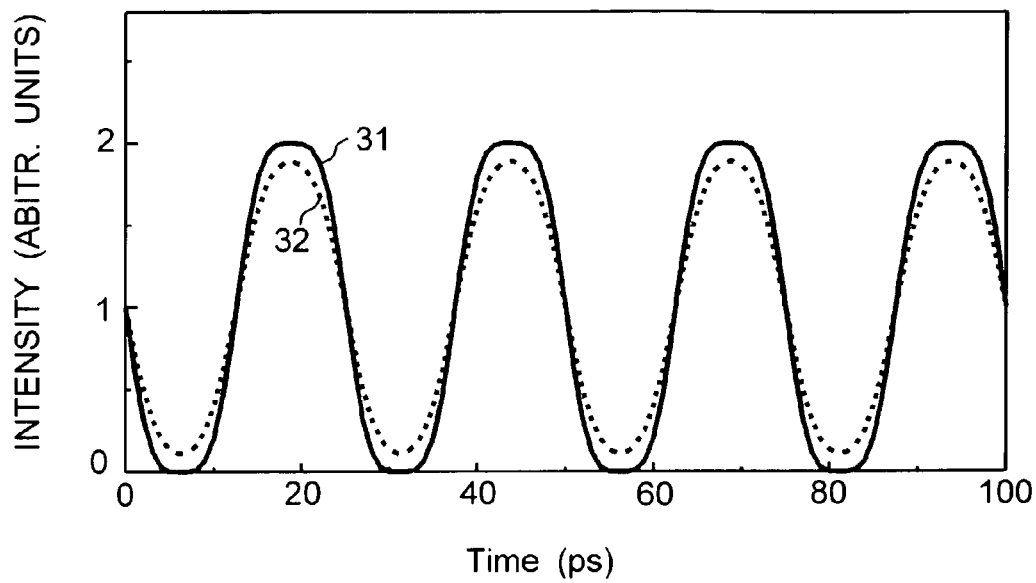
FIG. 3 is a plot of the output intensity waveforms for two values of peak-to-peak phase shift.

This result, as displayed in FIG. 2, shows that an extinction ratio larger than 15 dB can be obtained in a relatively wide range $0.4\pi<\Delta\phi_{p-p}<0.67\pi$. Calculated waveforms with two different values of $\Delta\phi_{p-p}$ ($0.5\pi$ and $0.35\pi$) are shown in FIG. 3 for comparison. A curve for a value of $0.5\pi$ is shown at 31, and a curve for a value of $0.35\pi$ is shown at 32.

The invention was experimentally demonstrated by constructing an RZ pulse generator operating at 40 Gb/s. A LiNbO₃ phase modulator made by Sumitomo (T PM 1.5–40) was used for the demonstration. A polarization controller was used to adjust the polarization of the light signal before it is introduced into the modulator. A 40 GHz sinusoidal electrical signal was generated by a signal synthesizer and amplified by a 40 GHz narrow band power amplifier made by Narda DBS Microwave. The phase-modulated optical signal was then transmitted through several segments of standard single mode fiber with a total dispersion of 39 ps/nm to produce the optical pulses.

Figure 4:
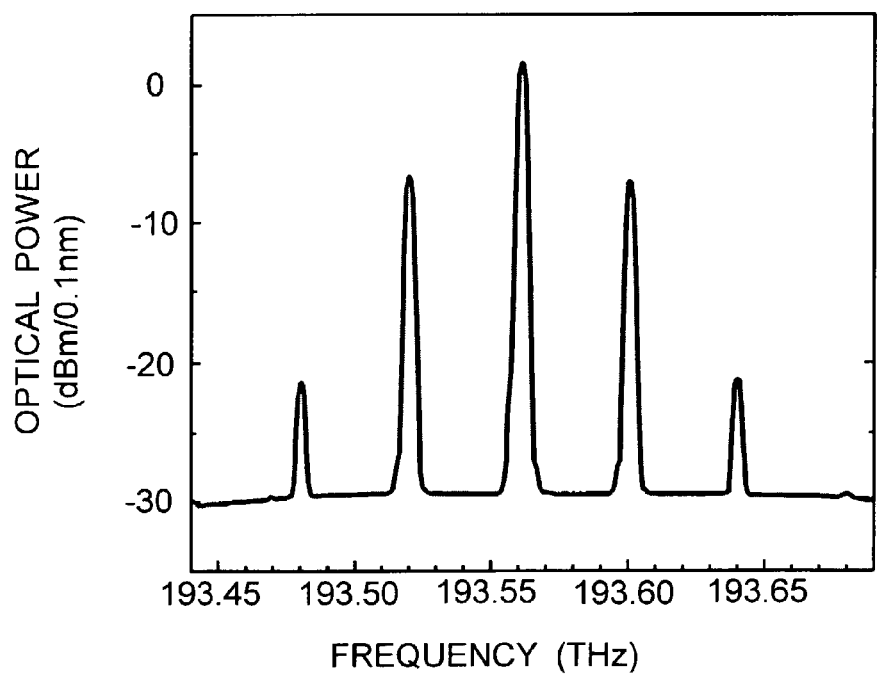
FIG. 4 is a plot of optical power vs. frequency showing the optical power spectrum for a typical phase-modulated pulse stream used in the pulse generator of the invention.

FIG. 4 shows the optical power spectrum of the phase-modulated signal measured with an optical spectrum analyzer (OSA). The central carrier frequency and side tones spaced at 40 GHz are clearly visible. The two nearest side tones (±40 GHz) are ~8 dB lower than the central carrier, which corresponds to a phase modulation depth of $\Delta\phi_{p-p}\approx 0.45\pi$.

Figure 5:
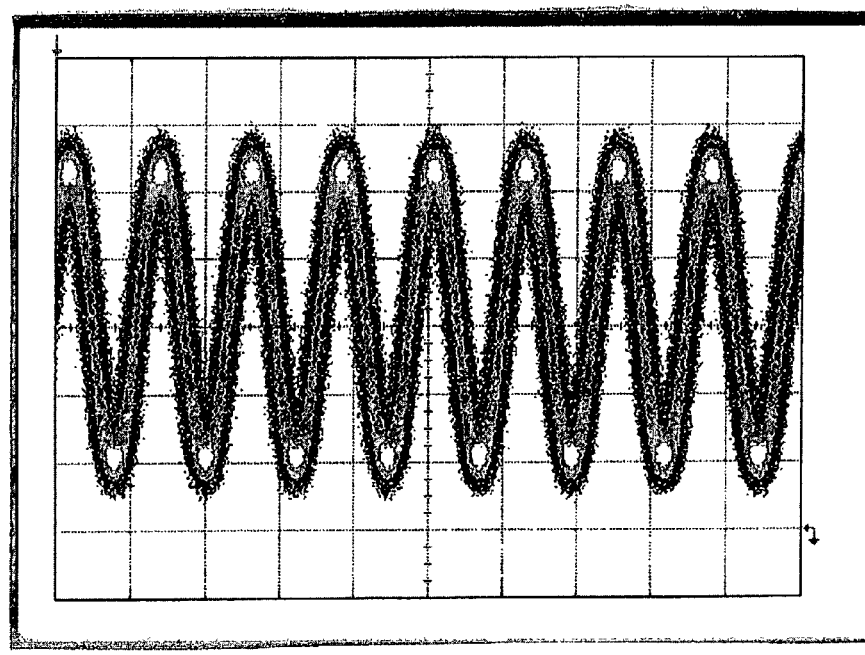
FIG. 5 is an oscilloscope trace showing a typical output for the optical pulse generator of the invention.

The optical pulses after the dispersive fiber were measured with a photodiode and a sampling oscilloscope, and are shown in FIG. 5. Due to the limited response time of the photodiode and the scope, the extinction ratio was not measured directly. With the modulation magnitude of $\Delta\phi_{p-p}\approx 0.45\pi$ as derived from the OSA, it is expected that the extinction ratio is ~20 dB. The optical pulses were also measured with an Advantest chirpform test set (Model Q7606B) and it was found that the output pulses were essentially chirp-free.

An important concept of this invention is to manipulate or align the phases of the different frequency components (as shown in FIG. 4) of the phase-modulated optical signal to convert it to an intensity-modulated optical signal. Chromatic dispersion is just one method to achieve such phase alignment, and there are other methods to achieve the same thing. One such example is a Fourier filter illustrated in FIG. 6. This device comprises three optical couplers linked by two differential delays of 12.5 ps each (for R=40 GHz). This device appears quite different from a dispersive fiber in that it relies on interference effect. Nevertheless, as will be explained below, it is the dispersion (or phase) property of this device that makes it useful for the pulse generator. The Fourier filter shown in FIG. 6 can be fine tuned (by tuning the phase shifters on the differential delays) to achieve the following transfer function in the frequency domain $$f(\omega) = \frac{1}{2}(1+i)\left[1 - i\cos\frac{(\omega-\omega_0)T}{2}\right]. \quad (18)$$

Figure 7:
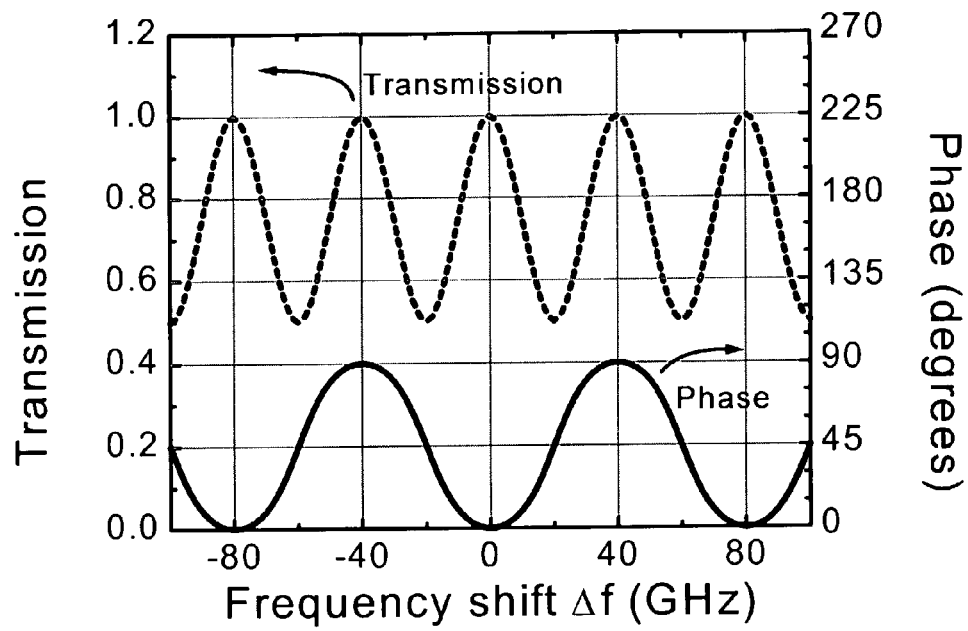
FIG. 7 is the frequency characteristics of the Fourier filter shown in FIG. 6.

The transmission (square of magnitude) and phase of $f(\omega)$ vs. the frequency shift $$\Delta f = \frac{1}{2\pi}(\omega - \omega_0) \quad (5)$$

are plotted in FIG. 7. At the discrete frequencies of the phase-modulated optical signal (0,±40 GHz, ±80 GHz, ...), this Fourier filter has exactly the same effect as the dispersive fiber described earlier and therefore can be substituted for the fiber without changing any properties of the output pulses. The Fourier filter has several additional advantages, for example, it can be much smaller than as pool of fiber, and it may also be integrated with the phase modulator on the same substrate to lower the cost substantially.

Aligning the phases of discrete frequency components of an optical signal for pulse shaping has been proposed earlier by Griffin. See R. A. Griffin, "Optical pulse train generator", U.K. Patent Application No. 0017937.4 (filed on Jul. 22, 2000 and published on Feb. 13, 2002). However, in that patent application the input optical signal is an intensity modulated signal generated by an MZM and the driver frequency is equal to half of the desired pulse repetition rate. In the invention described here, the input optical signal before the Fourier filter is a phase-modulated optical signal, and the driver frequency is exactly equal to the desired pulse repetition rate.

The theory and experiment presented above have demonstrated that this method is suitable for producing chirp-free optical pulses with a duty cycle of 50%. Other duty cycles can also be achieved using this technique with minor modifications. One such modification is to remove all high order side tones ($\omega_0 \pm 2\Omega$, $\omega_0 \pm 3\Omega$, ...) with a narrow optical filter and keep only the carrier frequency ($\omega_0$) and two nearest side tones ($\omega_0 \Omega$). If we choose $\Delta\phi_{p-p} \approx 0.57\pi$, the two side tones would be approximately 6 dB lower than the central carrier and the waveform after the dispersive fiber or the Fourier filter would be:

$$E_{IM}(t) = C\left[1 + \frac{1}{2}\exp(i\Omega t) + \frac{1}{2}\exp(-i\Omega t)\right]\exp(-i\omega_0 t) + c.c. \quad (18)$$
$$= C(1 + \cos\Omega t)\exp(-i\omega_0 t) + c.c.$$

Figure 8:
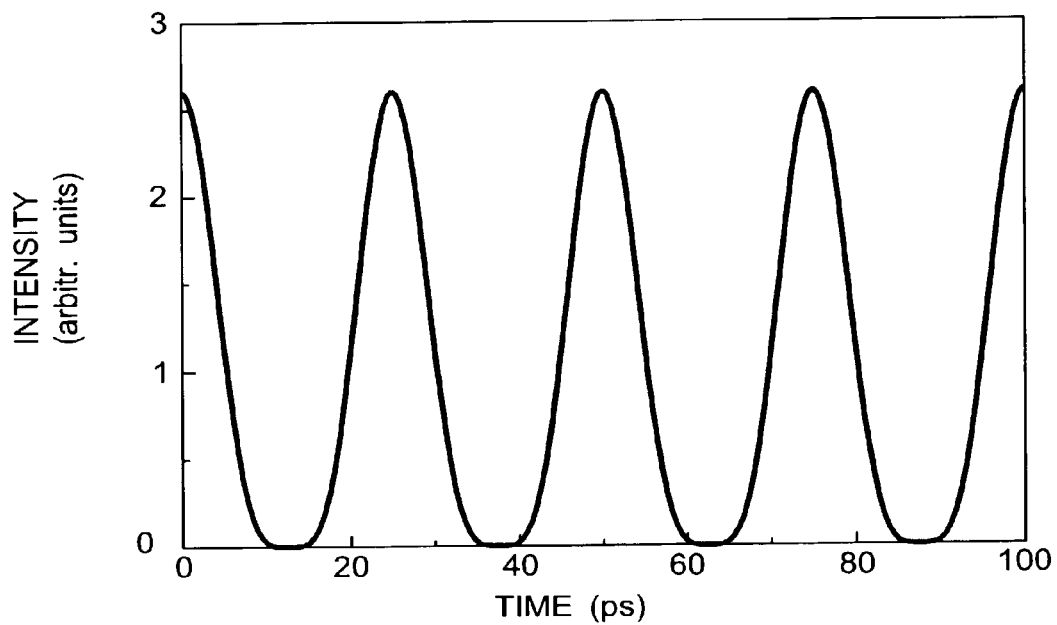
FIG. 8 is a plot (calculated) of intensity in arbitrary units vs. time in picoseconds for an optical pulse stream with a 36% duty cycle.

This corresponds to a chirp-free optical pulse train with a duty cycle of ~36%. A calculated waveform is shown in FIG. 8.

Figure 6:
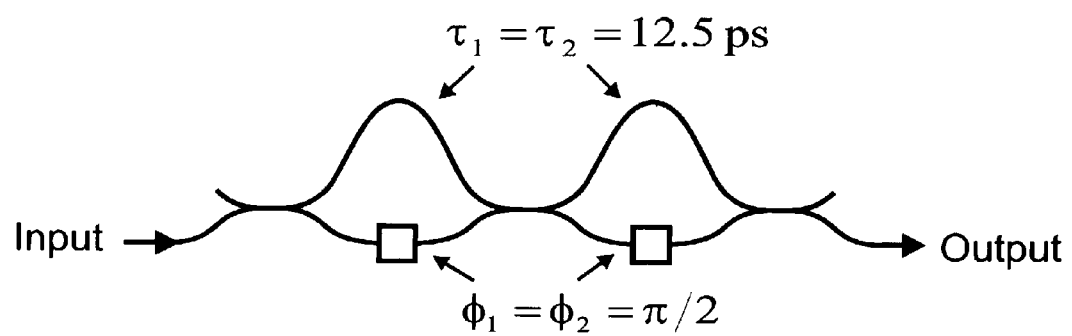
FIG. 6 is a Fourier filter comprising three optical couplers linked by two differential delays of 12.5 ps each.
Figure 9:
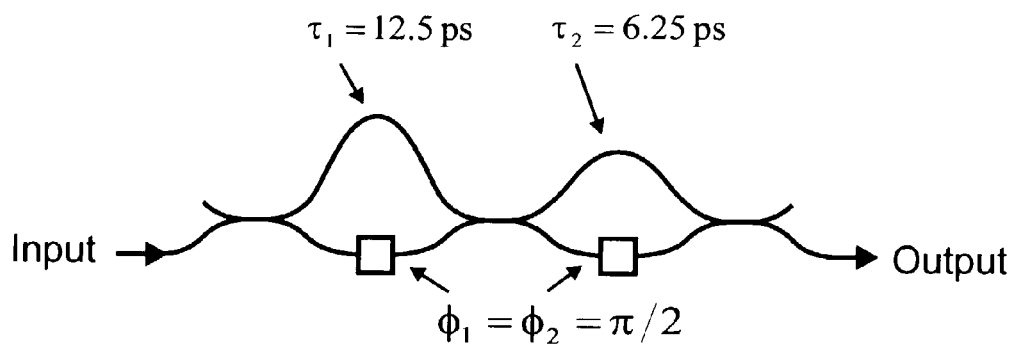
FIG. 9 is a Fourier filter comprising three optical couplers linked by two differential delays of 12.5 ps and 6.25 ps.
Figure 10:
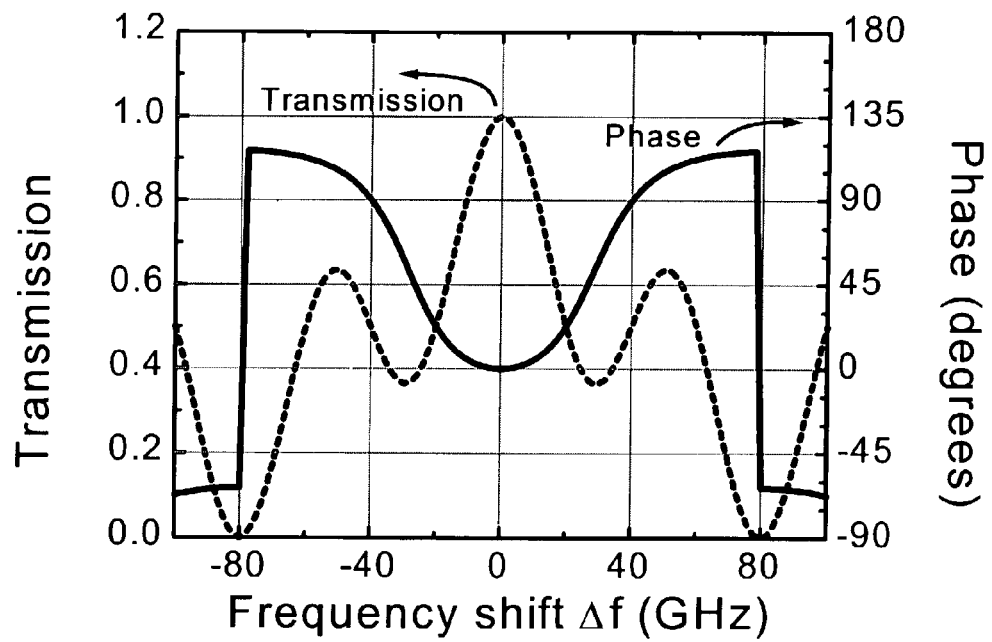
FIG. 10. is the frequency characteristics of the Fourier filter shown in FIG. 9.

The idea of removing higher order tones can also be implemented in a special design of the Fourier filter, which is shown in FIG. 9. The only difference between this Fourier filter and the one shown in FIG. 6 is that the second differential delay in FIG. 9 is 6.25 ps (one quarter of the bit period). The order of the two differential delays can be reversed, i.e., the first differential delay is 6.25 ps and the second one is 12.5 ps. This device can be fine tuned to achieve the following transfer function:

$$f(\omega) = \frac{1}{2}(1+i)\left[\cos\frac{(\omega-\omega_0)T}{8} - i\cos\frac{(\omega-\omega_0)T}{8}\right]. \quad (19)$$

The transmission (square of magnitude) and phase of $f(\omega)$ vs. the frequency shift $$\Delta f = \frac{1}{2\pi}(\omega - \omega_0)$$

are plotted in FIG. 9. This Fourier filter produces the same amount of phase shift at the three major frequencies, i.e., no phase shift at the center frequency and $\pi/2$ (or 90°) phase shift at ±40 GHz. This filter completely blocks the two frequency components at ±80 GHz (the contributions from even higher order frequency components, e.g. ±120 GHz, can be neglected). Since there is a 3 dB loss at ±40 GHz, the phase modulator must be driven harder in order to achieve an output pulse train similar to that shown in FIG. 8. Calculation shows the required peak-to-peak phase shift of the phase modulation is $0.7\pi$ (again, with a tolerance of $\pm 0.1\pi$).

In fact, the duty cycle of the pulses can vary continuously between 34% and 50% as we vary the second differential delay between one quarter and one half of a bit period. The modulation depth of the phase modulation will have to be varied accordingly to achieve a good extinction ratio.

The concept of this pulse generator can be further generalized by using more sophisticated optical filters with desired dispersion properties. See. G. Lenz, B. J. Eggleton, C. R. Giles, C. K. Madsen, and R. E. Slusher, "Dispersive properties of optical filters for WDM systems", IEEE J. Quantum Electron., 34, 1390–1402 (1998). One example is to use higher order dispersion. As shown by Eq. (7), if there is access to all the higher order dispersion terms $\beta_3$, $\beta_4$, ..., then the phases of all the frequency components can be manipulated in an arbitrary way.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical pulse generator comprising:
   a. a phase-modulated light source consisting essentially of:
      i. a CW laser for providing a CW light output,
      ii. a phase modulator coupled to the CW laser to produce a phase modulated light source that is phase-modulated only wherein the phase-modulated light source has a phase modulation depth $\Delta\phi_{p-p}$ in the range from $0.3\pi$ to $0.9\pi$,
   b. a dispersive element coupled to the phase-modulated light source, wherein the phase modulated light source is not amplitude modulated prior to encountering the dispersive element, to convert the phase-modulated light signal to a periodic essentially chirp-free light pulse train and
   c. a data modulator for modulating the essentially chirp-free light pulse train.

2. The optical pulse generator of claim 1 wherein the phase-modulated light source has a modulation frequency $\Omega/2\pi$ equal to the desired pulse repetition rate R.

3. The optical pulse generator of claim 1 wherein the CW laser and the phase modulator are integrated on one substrate.

4. The optical pulse generator of claim 1 wherein the phase modulator and the dispersive element are integrated on one substrate.

5. The optical pulse generator of claim 1 wherein the dispersive element is a length of optical fiber.

6. The optical pulse generator of claim 5 wherein the total group velocity dispersion of the fiber is:

$$|DL| = c/2\lambda^2 R^2 \pm 20\%$$

where c is the speed of light, $\lambda$ is the wavelength of the CW laser, and R is the pulse repetition rate.

7. The optical pulse generator of claim 1 wherein the dispersive element comprises Bragg gratings.

8. The optical pulse generator of claim 1 wherein the dispersive element is a tunable fiber grating.

9. The optical pulse generator of claim 1 wherein the dispersive element is a Fourier filter comprising three optical couplers linked by two differential delays.

10. The optical pulse generator of claim 9 wherein one of the two differential delays is equal to one half of the pulse period within an accuracy of ±20%, and the other one is in the range between $1/5$ to $3/5$ of the pulse period.

11. An optical transmission system comprising an optical pulse generator according to claim 1, an optical path comprising a length of fiber optically coupled to the data modulator, and a receiver optically coupled to the optical path.

* * * * *